(12) United States Patent
Suzuki et al.

(10) Patent No.: US 11,175,574 B2
(45) Date of Patent: Nov. 16, 2021

(54) LIGHT SOURCE APPARATUS AND PROJECTOR

(71) Applicant: SEIKO EPSON CORPORATION, Tokyo (JP)

(72) Inventors: Junichi Suzuki, Matsumoto (JP); Hidefumi Sakata, Kamiina-gun (JP); Shingo Komiyama, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/724,506

(22) Filed: Dec. 23, 2019

(65) Prior Publication Data

US 2020/0201156 A1 Jun. 25, 2020

(30) Foreign Application Priority Data

Dec. 25, 2018 (JP) .............................. JP2018-241204

(51) Int. Cl.
| | |
|---|---|
| *G03B 21/20* | (2006.01) |
| *H04N 9/31* | (2006.01) |
| *F21V 8/00* | (2006.01) |
| *G02B 27/14* | (2006.01) |

(52) U.S. Cl.
CPC ......... *G03B 21/204* (2013.01); *G02B 6/0003* (2013.01); *G02B 6/0011* (2013.01); *G02B 27/141* (2013.01); *G03B 21/2066* (2013.01); *H04N 9/3164* (2013.01)

(58) Field of Classification Search
CPC .............. G03B 21/204; G03B 21/2033; G03B 21/2013; G03B 21/208; H04N 9/3161; H04N 9/3164; H04N 9/3158; H04N 9/3152; G02B 6/0003
See application file for complete search history.

(56) References Cited

U.S. PATENT DOCUMENTS

| | | | |
|---|---|---|---|
| 2016/0266297 A1* | 9/2016 | Hikmet | ..................... F21V 9/32 |
| 2017/0315433 A1 | 11/2017 | Ronda et al. | |

FOREIGN PATENT DOCUMENTS

| | | | | |
|---|---|---|---|---|
| JP | 2009-529220 A | 8/2009 | | |
| JP | 2016/537770 A | 12/2016 | | |
| JP | 2017-536664 A | 12/2017 | | |
| WO | 2007/102940 A2 | 9/2007 | | |
| WO | WO-2008078820 A1 * | 7/2008 | ........... | G03B 21/208 |
| WO | 2015/058979 A1 | 4/2015 | | |

* cited by examiner

*Primary Examiner* — Ryan D Howard
(74) *Attorney, Agent, or Firm* — Oliff PLC

(57) ABSTRACT

A light source apparatus according to an aspect of the present disclosure includes a light source section that emits first light and excitation light having a first wavelength band, a light guide that causes the first light emitted from the light source section to propagate, a wavelength converter including a phosphor that emits second light having a wavelength band different from the wavelength band of the excitation light when the wavelength converter is excited with the excitation light emitted from the light source section, and a light combiner that combines the first light having exited out of the light guide with the second light having exited out of the wavelength converter. The light guide and the wavelength converter are disposed side by side, and a light transmissive member that transmits the first light is provided between the light source section and the light guide.

14 Claims, 7 Drawing Sheets

LIGHT SOURCE APPARATUS AND PROJECTOR

The present application is based on, and claims priority from JP Application Serial Number 2018-241204, filed Dec. 25, 2018, the disclosure of which is hereby incorporated by reference herein in its entirety.

BACKGROUND

1. Technical Field

The present disclosure relates to a light source apparatus and a projector.

2. Related Art

As a light source apparatus used in a projector, there has been a proposed light source apparatus using fluorescence emitted from a phosphor when the phosphor is irradiated with excitation light emitted from a light emitting device. JP-T-2017-536664 discloses an illuminator including a rod-shaped ceramic element providing a wavelength conversion effect and a light emitting diode (LED) that emits excitation light and so configured that the excitation light is caused to enter the ceramic element via a side surface thereof and the resultant converted light is extracted via an end surface of the ceramic element.

As described in JP-T-2017-536664, causing the light emitted from the LED to enter the wavelength conversion member allows generation of light having a wavelength different from the wavelength of the light emitted from the LED. For example, when the wavelength conversion member contains a yellow phosphor, yellow light can be generated from blue light emitted from the LED. To generate white light necessary as a light source apparatus fora projector, however, a light source that emits the blue light and a light combining element or any other optical system that combines the blue light and the yellow light with each other need to be separately provided in addition to the illuminator disclosed in JP-T-2017-536664. As a result, there is a problem of an increase in the size of the light source apparatus. Further, generating color light instead of white light also requires an optical system for combining the fluorescence with the other color light and therefore has the problem of an increase in the size of the light source apparatus.

SUMMARY

A light source apparatus according to an aspect of the present disclosure includes a light source section that emits first light and excitation light having a first wavelength band, a light guide that causes the first light emitted from the light source section to propagate, a wavelength converter including a phosphor that emits second light having a wavelength band different from the wavelength band of the excitation light when the wavelength converter is excited with the excitation light emitted from the light source section, and a light combiner that combines the first light having exited out of the light guide with the second light having exited out of the wavelength converter. The light guide and the wavelength converter are disposed side by side, and a light transmissive member that transmits the first light is provided between the light source section and the light guide.

In the light source apparatus according to the aspect of the present disclosure, the light guide may have a first end surface and a second end surface that face each other and a first side surface that intersects the first end surface and the second end surface. The wavelength converter may have a third end surface and a fourth end surface that face each other and a second side surface that intersects the third end surface and the fourth end surface. The light source section may be provided in a position where the light source section faces the first side surface and the second side surface. The light transmissive member may be provided between the light source section and the first side surface.

In the light source apparatus according to the aspect of the present disclosure, the light combiner may be disposed in a position where the light combiner faces the second end surface and the fourth end surface.

In the light source apparatus according to the aspect of the present disclosure, the light combiner may include a prism that faces the second end surface and a dichroic prism that faces the fourth end surface.

In the light source apparatus according to the aspect of the present disclosure, the light transmissive member may be made of transparent resin.

In the light source apparatus according to the aspect of the present disclosure, a refractive index of the light transmissive member may be equal to a refractive index of the light guide.

In the light source apparatus according to the aspect of the present disclosure, the light transmissive member may be in contact with the light source section and the light guide.

In the light source apparatus according to the aspect of the present disclosure, the light guide and the wavelength converter may be so disposed that the light guide and the wavelength converter are adjacent to each other and a lengthwise direction of the light guide is parallel to a lengthwise direction of the wavelength converter.

In the light source apparatus according to the aspect of the present disclosure, the light source section may include a light emitting diode light source.

In the light source apparatus according to the aspect of the present disclosure, the first light may be blue light, the second light may be yellow fluorescence, the light combiner may combine the first light and the second light with each other into white combined light, and the white combined light may exit out of the light combiner.

A projector according to another aspect of the present disclosure includes the light source apparatus according to the aspect of the present disclosure, a light modulator that modulates light from the light source apparatus in accordance with image information, and a projection optical apparatus that projects the light modulated by the light modulator.

DESCRIPTION OF EXEMPLARY EMBODIMENTS

First Embodiment

A first embodiment of the present disclosure will be described below with reference to FIGS. 1 to 4.

A projector according to the present embodiment is an example of a liquid crystal projector using a liquid crystal panel as a light modulator.

Figure 1:
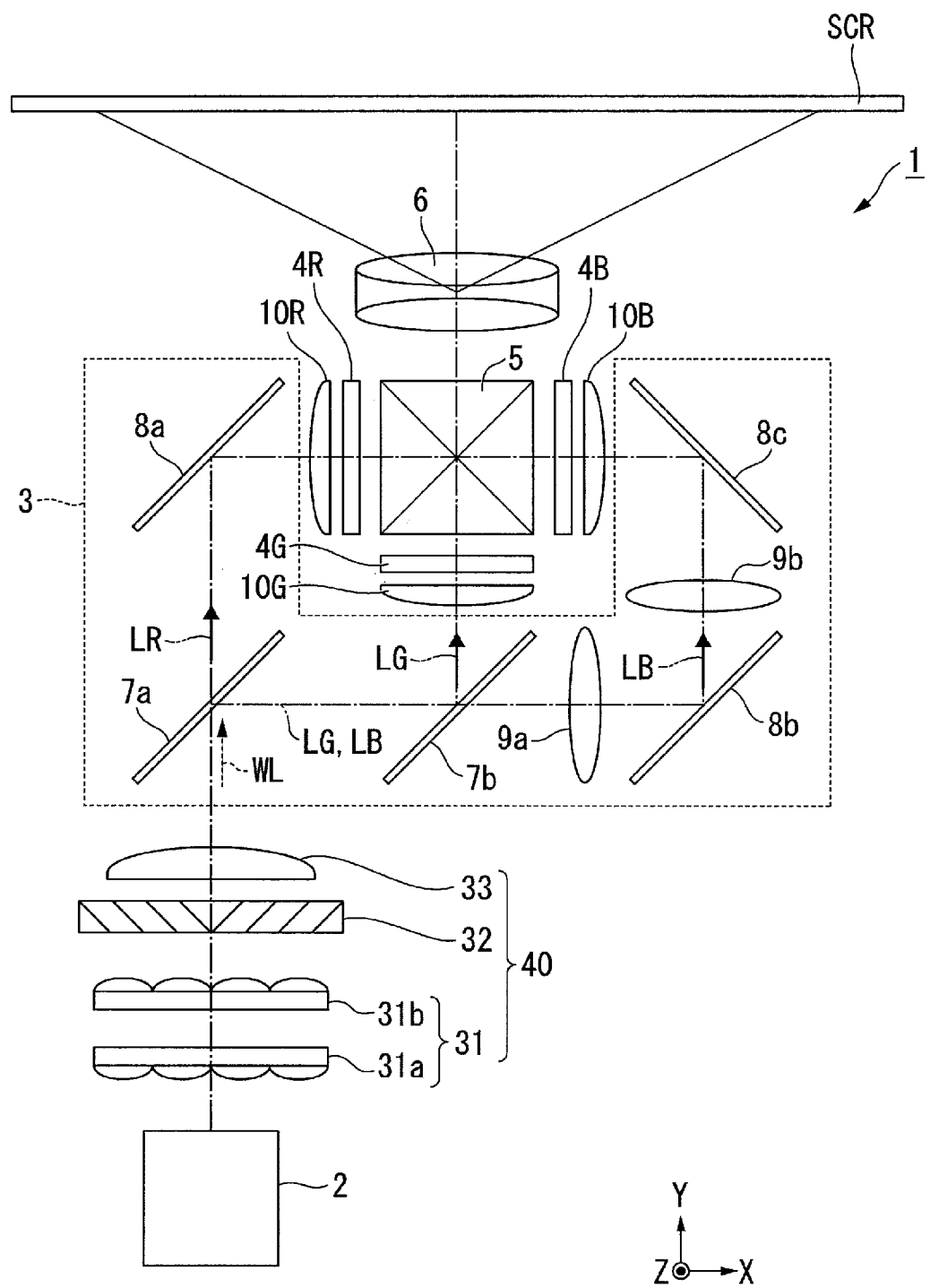
FIG. 1 is a schematic configuration diagram of a projector according to a first embodiment.

FIG. 1 is a schematic configuration diagram of a projector 1 according to the first embodiment.

In the following drawings, components are drawn at different dimensional scales in some cases for clarity of each of the components.

The projector 1 according to the first embodiment is a projection-type image display apparatus that projects a color image on a screen (projection receiving surface) SCR. The projector 1 uses three light modulators corresponding to color light formed of red light LR, green light LG, and blue light LB.

The projector 1 includes a light source apparatus 2, a uniform illumination system 40, a color separation system 3, a light modulator 4R, a light modulator 4G, a light modulator 4B, a light combining system 5, and a projection optical apparatus 6, as shown in FIG. 1.

The light source apparatus 2 emits illumination light WL toward the uniform illumination system 40. A detailed configuration of the light source apparatus 2 will be described later in detail.

The uniform illumination system 40 includes an optical integration system 31, a polarization converter 32, and a superimposing system 33. The optical integration system 31 includes a first lens array 31a and a second lens array 31b. The uniform illumination system 40 homogenizes the intensity distribution of the illumination light WL, which is emitted from the light source apparatus 2, at each of the light modulators 4R, 4G, and 4B, which are each a region to be illuminated. The illumination light WL having exited out of the uniform illumination system 40 enters the color separation system 3.

The color separation system 3 separates the illumination light WL, which is white light, into the red light LR, the green light LG, and the blue light LB. The color separation system 3 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a separates the illumination light WL from the light source apparatus 2 into the red light LR and the other light (green light LG and blue light LB). The first dichroic mirror 7a transmits the separated red light LR and reflects the other light (green light LG and blue light LB). On the other hand, the second dichroic mirror 7b separates the other light into the green light LG and the blue light LB. The second dichroic mirror 7b reflects the separated green light LG and transmits the blue light LB.

The first reflection mirror 8a is disposed in the optical path of the red light LR and reflects the red light LR having passed through the first dichroic mirror 7a toward the light modulator 4R. On the other hand, the second reflection mirror 8b and the third reflection mirror 8c are disposed in the optical path of the blue light LB and reflect the blue light LB having passed through the second dichroic mirror 7b toward the light modulator 4B. The green light LG is reflected off the second dichroic mirror 7b toward the light modulator 4G.

The first relay lens 9a and the second relay lens 9b are disposed in the optical path of the blue light LB on the light exiting side of the second dichroic mirror 7b. The first relay lens 9a and the second relay lens 9b correct the difference in illumination distribution of the blue light LB from those of the red light LR and the green light LG resulting from the fact that the optical path of the blue light LB is longer than the optical paths of the red light LR and the green light LG.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulators 4R, 4G, and 4B are each formed, for example, of a transmissive liquid crystal panel. Polarizers (not shown) are disposed on the light incident side and the light exiting side of each of the liquid crystal panels and each transmit only light linearly polarized in a specific direction.

Field lenses 10R, 10G, and 10G are disposed on the light incident side of the light modulators 4R, 4G, and 4B, respectively. The field lenses 10R, 10G, and 10B parallelize the chief rays of the red light LR, the green light LG, and the blue light LB to be incident on the light modulators 4R, 4G, and 4B, respectively.

The light combining system 5, on which the image light emitted from each of the light modulators 4R, 4G, and 4B is incident, combines the image light corresponding to the red light LR, the image light corresponding to the green light LG, and the image light corresponding to the blue light LB with one another and causes the combined image light to exit toward the projection optical apparatus 6. The light combining system 5 is formed, for example, of a cross dichroic prism.

The projection optical apparatus 6 is formed of a plurality of projection lenses. The projection optical apparatus 6 enlarges the combined image light from the light combining systems 5 and projects the enlarged image light toward a screen SCR. An image is thus displayed on the screen SCR.

The light source apparatus 2 will be described below.

Figure 2:
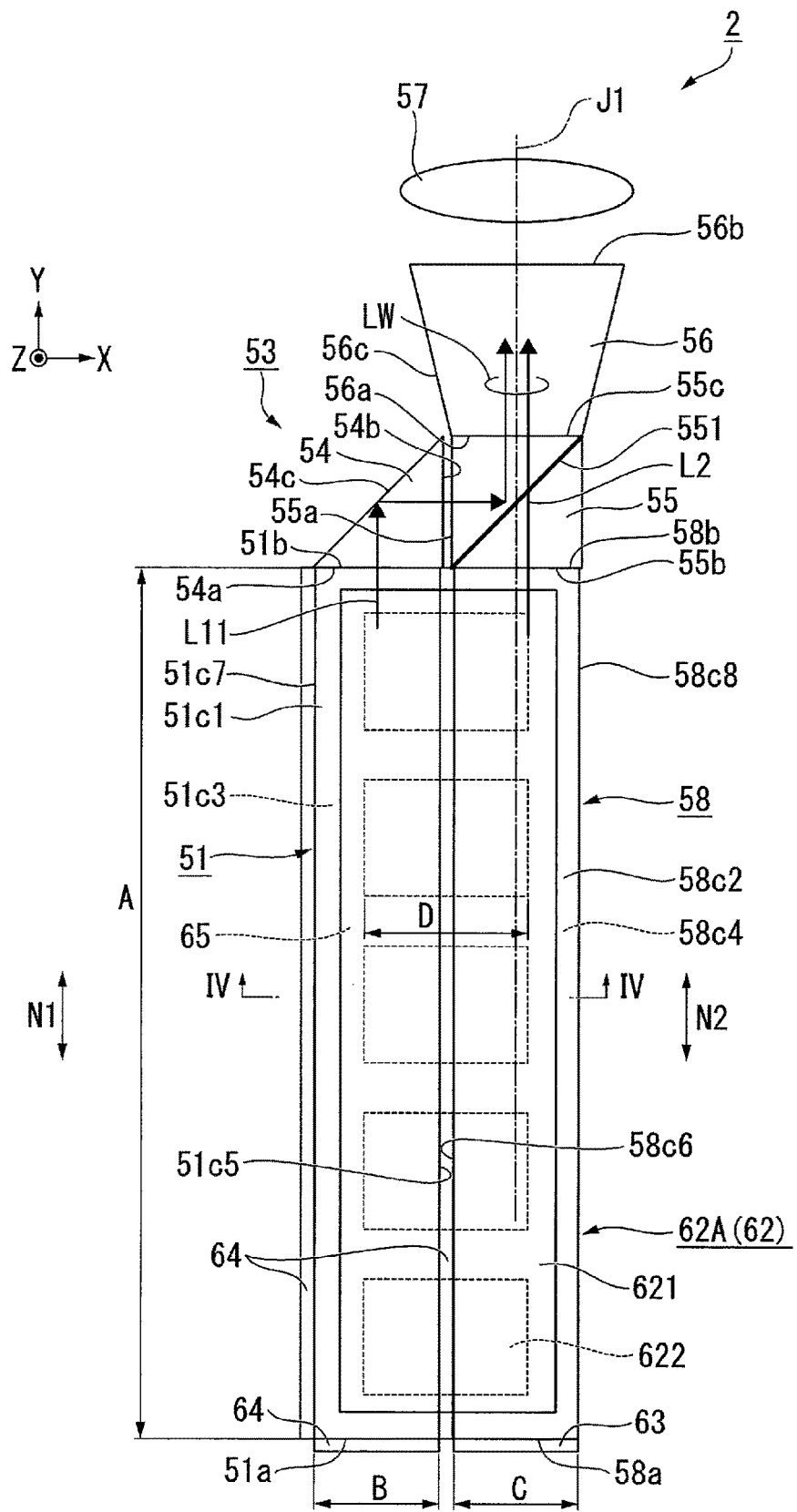
FIG. 2 is a plan view of a light source apparatus.
Figure 3:
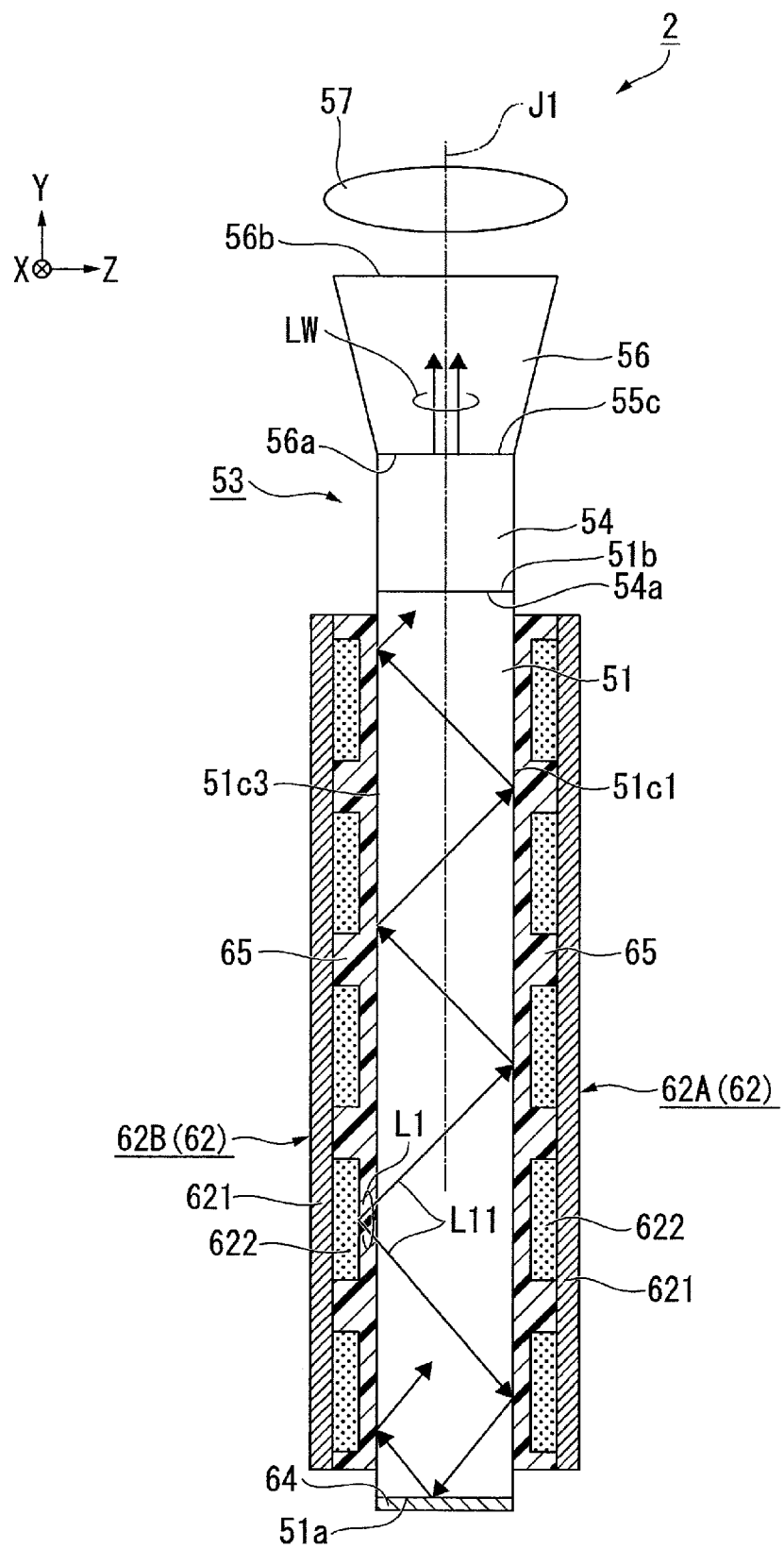
FIG. 3 is a side view of the light source apparatus.
Figure 4:
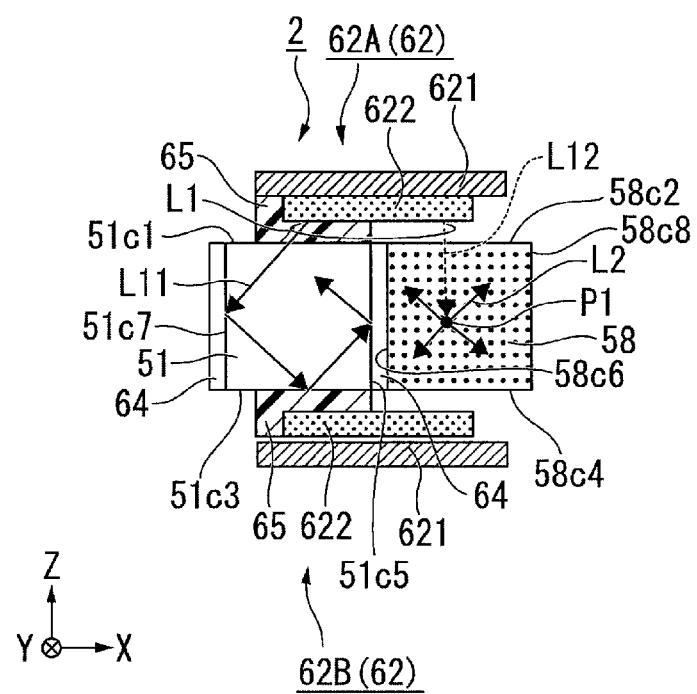
FIG. 4 is a cross-sectional view taken along the line IV-IV in FIG. 2.

FIG. 2 is a plan view showing a schematic configuration of the light source apparatus 2. FIG. 3 is a side view of the light source apparatus 2 viewed from the side facing a light guiding rod 51. FIG. 4 is a cross-sectional view of the light source apparatus 2 taken along the line IV-IV in FIG. 2.

The light source apparatus 2 includes a light guiding rod 51 (light guide), a wavelength conversion rod 58 (wavelength converter), a light source section 62, a light transmissive member 65, a light combiner 53, an angle converter 56, and a collimator lens 57, as shown in FIGS. 2 and 3.

The light guiding rod 51 has a quadrangular columnar shape having six surfaces. The six surfaces include two end surfaces 51a and 51b, which face each other, and four side surfaces 51c1, 51c3, 51c5, and 51c7, which intersect the two end surfaces 51a and 51b.

In the following description, the end surface 51a is referred to as a first end surface 51a, and the end surface 51b is referred to as a second end surface 51b. The first end surface 51a is an end surface of the light guiding rod 51 that is the end surface located on the side farther from the light combiner 53, which will be described later, and the second end surface 51b is an end surface of the light guiding rod 51 that is the end surface which faces the first end surface 51a and via which light exits out of the light guiding rod 51. The side surface 51c1 is referred to as a first side surface 51c1, the side surface 51c3 is referred to as a third side surface 51c3, the side surface 51c5 is referred to as a fifth side surface 51c5, and the side surface 51c7 is referred to as a seventh side surface 51c7. The direction in which the first end surface 51a and the second end surface 51b face each other is defined as a lengthwise direction N1 of the light guiding rod 51.

Similarly, the wavelength conversion rod 58 has a quadrangular columnar shape having six surfaces. The six surfaces include two end surfaces 58a and 58b, which face each other, and four side surfaces 58c2, 58c4, 58c6, and 58c8, which intersect the two end surfaces 58a and 58b.

In the following description, the end surface 58a is referred to as a third end surface 58a, and the end surface 58b is referred to as a fourth end surface 58b. The third end surface 58a is an end surface of the wavelength conversion rod 58 that is the end surface located on the side on which the first end surface 51a of the light guiding rod 51 is located, the fourth end surface 58b is an end surface of the wavelength conversion rod 58 that is the end surface which faces the third end surface 58a and via which light exits out of the wavelength conversion rod 58. The side surface 58c2 is referred to as a second side surface 58c2, the side surface 58c4 is referred to as a fourth side surface 58c4, the side surface 58c6 is referred to as a sixth side surface 58c6, and the side surface 58c8 is referred to as an eighth side surface 58c8. The direction in which the third end surface 58a and the fourth end surface 58b face each other is defined as a lengthwise direction N2 of the wavelength conversion rod 58. An axis passing through the center of the third end surface 58a of the wavelength conversion rod 58 and the center of the fourth end surface 58b thereof is defined as an optical axis J1 of the light source apparatus 2. Combined light LW from the light source apparatus 2 exits along the optical axis J1.

In the present embodiment, the light guiding rod 51 and the wavelength conversion rod 58 have substantially the same dimensions. A dimension A of the light guiding rod 51 in the lengthwise direction N1 is greater than a dimension B of the light guiding rod 51 in the widthwise direction thereof (direction perpendicular to lengthwise direction N1). For example, the dimension A is greater than the dimension B by a factor of about a dozen to several dozens. The wavelength conversion rod 58 is configured in the same manner as is the light guiding rod 51.

The light guiding rod 51 and the wavelength conversion rod 58 are so disposed side by side with a gap therebetween that the fifth side surface 51c5 of the light guiding rod 51 faces the sixth side surface 58c6 of the wavelength conversion rod 58. In the present specification, the description "a light guiding rod and a wavelength conversion rod are disposed side by side" means that the light guiding rod and the wavelength conversion rod are so disposed that side surfaces thereof face each other.

In the present embodiment, the light guiding rod 51 and the wavelength conversion rod 58 are so disposed that the two rods are adjacent to each other and the lengthwise direction N1 of the light guiding rod 51 is parallel to the lengthwise direction N2 of the wavelength conversion rod 58. The arrangement described above allows a decrease in the width (dimension in direction perpendicular to optical axis J1) of the light source apparatus 2. The lengthwise direction N1 of the light guiding rod 51 and the lengthwise direction N2 of the wavelength conversion rod 58 are not necessarily parallel to each other and may deviate from the parallel arrangement or incline with each other.

The light source section 62 includes a first light source 62A and a second light source 62B, as shown in FIG. 3. The first light source 62A is provided in a position where the first light source 62A faces the light guiding rod 51 and the wavelength conversion rod 58, as shown in FIG. 2. More specifically, the first light source 62A is provided in a position where the first light source 62A faces the first side surface 51c1 of the light guiding rod 51 and the second side surface 58c2 of the wavelength conversion rod 58. That is, the light source section 62 is provided in a position where the light source section 62 faces the light guiding rod 51 and the wavelength conversion rod 58.

Although not shown, the second light source 62B is also provided in a position where the second light source 62B faces the light guiding rod 51 and the wavelength conversion rod 58, as is the first light source 62A. More specifically, the second light source 62B is provided in a position where the second light source 62B faces the third side surface 51c3 of the light guiding rod 51 and the fourth side surface 58c4 of the wavelength conversion rod 58.

The first light source 62A and the second light source 62B have the same configuration and each include a substrate 621 and a plurality of light emitting diode light sources 622 (LED light sources) mounted on one surface of the substrate 621 that is the surface facing the light guiding rod 51 and the wavelength conversion rod 58. In the present embodiment, the light sources 62A and 62B each include five LED light sources 622, but the number of LED light sources 622 is not limited to a specific number. The LED light sources 622 each emit first light L1 having a first wavelength band. The first wavelength band is, for example, a blue wavelength band, for example, from 400 to 480 nm and has a peak wavelength of, for example, 445 nm. The light sources 62A and 62B may each include a light guide plate, a diffuser plate, a lens, and other optical members as well as the substrate 621 and the LED light sources 622.

The plurality of LED light sources 622 are so provided as to face the first side surface 51c1 and the third side surface 51c3 of the light guiding rod 51 and the second side surface 58c2 and the fourth side surface 58c4 of the wavelength conversion rod 58. That is, the plurality of LED light sources 622 that form the first light source 62A are provided in positions where the LED light sources 622 overlap with the first side surface 51c1 of the light guiding rod 51 and the second side surface 58c2 of the wavelength conversion rod 58 when viewed along a normal to the first side surface 51c1 of the light guiding rod 51. Similarly, the plurality of LED light sources 622 that form the second light source 62B are provided in positions where the LED light sources 622 overlap with the third side surface 51c3 of the light guiding rod 51 and the fourth side surface 58c4 of the wavelength conversion rod 58 when viewed along a normal to the third side surface 51c3 of the light guiding rod 51.

In other words, the plurality of LED light sources 622 that form the first light source 62A are so provided as to face the first side surface 51c1 of the light guiding rod 51 and the second side surface 58c2 of the wavelength conversion rod 58. The plurality of LED light sources 622 that form the second light source 62B are so provided as to face the third side surface 51c3 of the light guiding rod 51 and the fourth side surface 58c4 of the wavelength conversion rod 58. The plurality of LED light sources 622 that form the first light source 62A and the second light source 62B are arranged along the lengthwise directions N1 and N2 of the rods 51 and 58 with a gap between each of the LED light sources 622 and an adjacent LED light source 622.

A width D of each of the LED light sources 622 (dimension in direction perpendicular to optical axis J1) is smaller than the sum of a width B of the light guiding rod 51 and a width C of the wavelength conversion rod 58, that is, the distance from the seventh side surface 51c7 of the light guiding rod 51 to the eighth side surface 58c8 of the wavelength conversion rod 58, as shown in FIG. 2. The width D of each of the LED light sources 622 may, however, be equal to the sum of the width B of the light guiding rod 51 and the width C of the wavelength conversion rod 58 or greater than the sum of the width B of the light guiding rod 51 and the width C of the wavelength conversion rod 58.

Further, in the present embodiment, in each of the LED light sources 622, the area of the region where the LED light source 622 faces the light guiding rod 51 is substantially equal to the area of the region where the LED light source 622 faces the wavelength conversion rod 58. That is, a center line of each of the LED light sources 622 that is the center line perpendicular to the direction of the width D is located between the light guiding rod 51 and the wavelength conversion rod 58.

Part of the light L1 emitted from each of the LED light sources 622 or partial light L11 propagates through the interior of the light guiding rod 51, then exits out of the light guiding rod 51, and functions as blue light that forms part of the illumination light, as shown in FIG. 4. Another part of the light L1 or other partial light L12 enters the wavelength conversion rod 58 and then functions as excitation light that excites a phosphor contained in the wavelength conversion rod 58. In the following description, the partial light L11 is referred to as first light L11, and the other partial light L12 is referred to as excitation light L12. The first light L11 and the excitation light L12 differ from each other in that they enter the different rods but are emitted from each single LED light source 622 and belong to the same wavelength band.

As described above, the function of the first light L11, which enters the light guiding rod 51, and the function of the excitation light L12, which enters the wavelength conversion rod 58, differ from each other. The LED light sources 622 therefore need to emit light having a wavelength capable of providing the two functions.

The light guiding rod 51 is made of a light transmissive material, for example, glass. The first light L11 emitted from the light sources 62A and 62B enters the light guiding rod 51, which causes the first light L11 to propagate through the interior thereof.

Out of the four side surfaces 51c1, 51c3, 51c5, and 51c7 of the light guiding rod 51, the fifth side surface 51c5 and the seventh side surface 51c7, which do not face the light source 62A or 62B, are each provided with a mirror 64. Further, the first end surface 51a of the light guiding rod 51 is provided with a mirror 64. These mirrors 64 are each formed, for example, of a dielectric multilayer film or a metal film formed on a surface of the light transmissive material of which the light guiding rod 51 is made. From a viewpoint of suppression of optical loss, the mirrors 64 are each desirably formed of a dielectric multilayer film.

The wavelength conversion rod 58 contains a phosphor that emits second light L2 when excited with the excitation light L12 emitted from the light source section 62. In the present embodiment, the phosphor is formed of a ceramic phosphor (polycrystal phosphor). The wavelength band of the second light L2 is, for example, a yellow wavelength band ranging from 490 to 750 nm. That is, the second light L2 is yellow fluorescence. The wavelength conversion rod 58 may be formed of a single-crystal phosphor in place of a polycrystal phosphor. The wavelength conversion rod 58 may instead be made of fluorescent glass. The wavelength conversion rod 58 may still instead be made of a glass or resin binder in which a large number of phosphor particles are dispersed.

Specifically, the wavelength conversion rod 58 is formed, for example, of an yttrium-aluminum-garnet-based (YAG-based) phosphor. Consider YAG:Ce, which contains cerium (Ce) as an activator, by way of example, and the wavelength conversion rod 58 can be made, for example, of a material produced by mixing raw material powder containing $Y_2O_3$, $Al_2O_3$, $CeO_3$, and other constituent elements with one another and causing the mixture to undergo a solid-phase reaction, Y-Al-O amorphous particles produced by using a coprecipitation method, a sol-gel method, or any other wet method, or YAG particles produced by using a spray-drying method, a flame-based thermal decomposition method, a thermal plasma method, or any other gas-phase method.

The wavelength conversion rod 58 includes a mirror 63 provided at the third end surface 58a of the wavelength conversion rod 58, as shown in FIG. 2. The mirror 63 is formed, for example, of a dielectric multilayer film or a metal film.

The light transmissive member 65 is provided between the light sources 62A, 62B and the light guiding rod 51, as shown in FIGS. 3 and 4. In more detail, the light transmissive member 65 is so provided between the LED light sources 622 of the first light source 62A and the first side surface 51c1 of the light guiding rod 51 and between the LED light sources 622 of the second light source 62B and the third side surface 51c3 of the light guiding rod 51 as to cover the light exiting surface of each of the LED light sources 622. The light transmissive member 65 is in contact with the light source section 62 and the light guiding rod 51.

The light transmissive member 65 is made, for example, of transparent resin, such as silicone resin, or glass frit. In the case where the light transmissive member 65 is made of transparent resin, the light transmissive member 65 can be readily manufactured. The light transmissive member 65 preferably has optical transparency and heat resistance. The light transmissive member 65 also functions as an adhesive that fixes the light sources 62A and 62B to the light guiding rod 51.

The refractive index of the light transmissive member 65 is desirably equal to the refractive index of the light guiding rod 51. The configuration described above causes no unnecessary refraction when the first light L11 enters the light guiding rod 51 from the light transmissive member 65, whereby the first light L11 enters the light guiding rod 51 at a predetermined angle. The amount of first light L11 that exits via the side surfaces of the light guiding rod 51 can thus be reduced, whereby the efficiency at which the first light L11 is used can be increased. The sentence "a refractive index of the light transmissive member is equal to a refractive index of the light guide" in the appended claims is a concept including a case where the refractive indices of the light transmissive member and the light guide differ from each other in such away that the resultant refraction of light is small enough not to affect the performance of the light source apparatus due to a decrease in the light use efficiency.

The light transmissive member 65 is desirably not provided between the light sources 62A, 62B and the wavelength conversion rod 58, as shown in FIG. 4. When the excitation light L12 enters the wavelength conversion rod 58, the excitation light L12 only needs to reach the phosphor, and the refraction that occurs when the excitation light L12 enters the wavelength conversion rod 58 does not greatly matter. The light transmissive member 65 may therefore not be provided between the light sources 62A, 62B and the wavelength conversion rod 58. It is, however, noted that the light transmissive member 65 may be provided between the light sources 62A, 62B and the wavelength conversion rod 58.

The light combiner 53 is disposed in a position where the light combiner 53 faces the second end surface 51b of the light guiding rod 51 and the fourth end surface 58b of the wavelength conversion rod 58, as shown in FIG. 2. The light combiner 53 combines the first light L11 having exited out of the light guiding rod 51 with the second light L2 having exited out of the wavelength conversion rod 58. The light combiner 53 includes a prism 54, which faces the second end surface 51b of the light guiding rod 51, and a dichroic prism 55, which faces the fourth end surface 58b of the wavelength conversion rod 58.

The prism 54 is so provided as to be in contact with the second end surface 51b of the light guiding rod 51. The prism 54 is formed of a triangular columnar prism having a right-angled isosceles triangular cross section and has a light incident end surface 54a, a reflection surface 54c, and a light exiting end surface 54b. The prism 54 has the function of deflecting the optical path of the incident first light L11 by 90° and causing the deflected first light L11 to exit. That is, the prism 54 causes the first light L11 having exited via the second end surface 51b of the light guiding rod 51 to be reflected off the reflection surface 54c to deflect the optical path of the first light L11 and causes the reflected first light L11 to exit via the light exiting end surface 54b.

The dichroic prism 55 is so provided as to face the fourth end surface 58b of the wavelength conversion rod 58 and the light exiting end surface 54b of the prism 54. The dichroic prism 55 has a configuration in which a dichroic mirror 551 is provided in a main body of the prism. The dichroic prism 55 has a cubic shape and has a light incident end surface 55a, a light incident end surface 55b, and a light exiting end surface 55c. The dichroic mirror 551 is characterized in that it reflects light having the blue wavelength band and transmits light having the yellow wavelength band. The first light L11 having exited out of the prism 54 is therefore reflected off the dichroic mirror 551 and travels toward the light exiting end surface 55c. On the other hand, the second light L2 having exited via the fourth end surface 58b of the wavelength conversion rod 58 passes through the dichroic mirror 551 and travels toward the light exiting end surface 55c.

The dichroic prism 55 thus combines the blue first light L11 having exited via the second end surface 51b of the light guiding rod 51 with the yellow second light L2 having exited via the fourth end surface 58b of the wavelength conversion rod 58. White combined light LW formed of the blue first light L11 and the yellow second light L2 then exits out of the dichroic prism 55. The first light L11 and the second light L2 are thus combined with each other in the light combiner 53 as described above, whereby the white combined light LW exits out of the light combiner 53.

The angle converter 56 is provided on the light exiting side of the light exiting end surface 55c of the dichroic prism 55. The angle converter 56 is formed of a tapered rod having a light incident end surface 56a, on which the combined light LW is incident, and a light exiting end surface 56b, via which the combined light LW exits. The angle converter 56 has a truncated pyramidal shape, with the cross-sectional area thereof perpendicular to the optical axis J1 increasing with distance along the traveling direction of the combined light LW, and the area of the light exiting end surface 56b is therefore greater than the area of the light incident end surface 56a. The thus shaped angle converter 56 angularly changes the traveling direction of the combined light LW, while the combined light LW travels through the interior of the angle converter 56, to the direction parallel to the optical axis J1 whenever the combined light LW is totally reflected off a side surface 56c of the angle converter 56. The angle converter 56 thus causes the diffusion angle of the combined light LW at the light exiting end surface 56b to be smaller than the diffusion angle of the combined light LW at the light incident end surface 56a.

The angle converter 56 is so fixed to the dichroic prism 55 that the light incident end surface 56a faces the light exiting end surface 55c of the dichroic prism 55. That is, the angle converter 56 and the dichroic prism 55 are in contact with each other via an optical adhesive (not shown), and no air gap (air layer) is provided between the angle converter 56 and the dichroic prism 55. It is noted that the angle converter 56 may instead be so fixed to the dichroic prism 55 as to be in direct contact therewith, for example, with the aid of an arbitrary support member. In either case, it is desirable that no air gap is provided between the angle converter 56 and the dichroic prism 55. It is further desirable that the refractive index of the angle converter 56 is as close as possible to the refractive index of the dichroic prism 55.

The angle converter 56 may be a compound parabolic concentrator (CPC) in place of the tapered rod. In the case where the angle converter 56 is formed of a CPC, the same effect as that provided when the angle converter 56 is formed of the tapered rod is provided.

The collimator lens 57 is provided on the light exiting side of the light exiting end surface 56b of the angle converter 56. The collimator lens 57 parallelizes the combined light LW having exited out of the angle converter 56. That is, the collimator lens 57 further increases the parallelism of the combined light LW having an angle distribution converted by the angle converter 56. The collimator lens 57 is formed of a convex lens. In a case where only the angle converter 56 provides sufficient parallelism of the combined light LW, the collimator lens 57 may not necessarily be provided.

An effect of the light source apparatus 2 having the configuration described above will be described below.

The first light L11, which is emitted from the LED light sources 622, passes through the light transmissive member 65 and enters the light guiding rod 51 via the first side surface 51c1, as shown in FIG. 4. The first light L11 having entered the light guiding rod 51 reaches any of the side surfaces 51c1, 51c3, 51c5, and 51c7 at an angle of incidence greater than or equal to the critical angle associated with the side surface. The first light L11 is reflected off the side surface, and the reflected first light L11 propagates through the interior of the light guiding rod 51 while repeatedly reflected off the side surfaces and travels toward the first end surface 51a or the second end surface 51b, as shown in FIG. 3. The first light L11 having traveled toward the second end surface 51b exits via the second end surface 51b and enters the prism 54. On the other hand, the first light L11 having traveled toward the first end surface 51a is reflected off the mirror 64 provided at the first end surface 51a and travels toward the second end surface 51b.

The first light L11 having exited via the second end surface 51b of the light guiding rod 51 is then reflected off the reflection surface 54c of the prism 54, so that the traveling direction of the first light L11 is changed, and the reflected first light L11 enters the dichroic prism 55, as shown in FIG. 2. A gap (air layer) is desirably provided between the prism 54 and the dichroic prism 55 so that the prism 54 and the dichroic prism 55 are not in direct contact with each other. Providing a gap between the prism 54 and the dichroic prism 55 prevents the first light L11 incident on the interface between the prism 54 and the dichroic prism 55 at angles of incidence smaller than the critical angle associated with the interface out of the first light L11 having traveled to the interface and the vicinity thereof from leaking out of the prism 54 or the dichroic prism 55, whereby the light use efficiency can be increased.

On the other hand, the excitation light L12 enters the wavelength conversion rod 58, as shown in FIG. 4. At this point, the excitation light L12 excites the phosphor contained in the wavelength conversion rod 58, and the second light L2 is emitted from an arbitrary light emission point P1. The second light L2 travels omnidirectionally from the arbitrary light emission point P1, and the second light L2 traveling toward the side surfaces 58c2, 58c4, 58c6, and 58c8 travels toward the third end surface 58a or the fourth end surface 58b while being repeatedly totally reflected off the side surfaces 58c2, 58c4, 58c6, and 58c8, as shown in FIG. 2. The second light L2 traveling toward the fourth end surface 58b exits via the fourth end surface 58b and then enters the dichroic prism 55. On the other hand, the second light L2 traveling toward the third end surface 58a is reflected off the mirror 63 provided at the third end surface 58a and then travels toward the fourth end surface 58b.

The first light L11 having entered the dichroic prism 55 is reflected off the dichroic mirror 551. On the other hand, the second light L2 having entered the dichroic prism 55 passes through the dichroic mirror 551. As a result, the blue first light L11 and the yellow second light L2 are combined with each other, and the white combined light LW exits via the light exiting end surface 55c of the dichroic prism 55. The combined light LW having exited out of the dichroic prism 55 is parallelized by the angle converter 56 and the collimator lens 57 and then emitted from the light source apparatus 2. The combined light LW (illumination light WL) emitted from the light source apparatus 2 travels toward the optical integration system 31, as shown in FIG. 1.

The light source apparatus 2 according to the present embodiment is configured as follows: The light guiding rod 51, out of which the blue first light L11 exits, and the wavelength conversion rod 58, out of which the yellow second light L2 exits, are disposed side by side; the light combiner 53 is disposed at the second end surface 51b of the light guiding rod 51 and the fourth end surface 58b of the wavelength conversion rod 58; the light source section 62 is so provided as to face the first side surface 51c1 of the light guiding rod 51 and the side surface 58c2 of the wavelength conversion rod 58. A compact light source apparatus 2 capable of emitting white light can thus be achieved.

The light source apparatus 2 according to the present embodiment has the configuration in which the blue light L11 emitted from the light source section 62 is guided by the light guiding rod 51 to the light combiner 53. The light source apparatus 2 can efficiently produce blue light in the simple configuration without a separately prepared phosphor light source capable of emitting the blue light, for example, the combination of an ultraviolet LED and a blue phosphor.

The LED light sources 622 each emit light having the Lambertian light orientation form. It is therefore difficult in some cases to cause the first light L11 emitted from each of the LED light sources 622 to be efficiently incident on an end surface of the light guiding rod 51 particularly in a case where the width of the light guiding rod 51 (dimension B in FIG. 2) is smaller than the width of each of the LED light sources 622 (dimension D in FIG. 2). Therefore, when the LED light sources 622 are used, it is reasonable to employ the configuration in which the LED light sources 622 are so disposed as to face a side surface of the light guiding rod 51 and the first light L11 is caused to enter the light guiding rod 51 via the side surface thereof, as in the present embodiment.

However, even in the configuration in which the LED light sources 622 face a side surface of the light guiding rod 51, the light exiting surface of each of the LED light sources 622 extends off the side surface of the light guiding rod 51 in some cases when the width of each of the LED light sources 622 is greater than the width of the light guiding rod 51. In this case, part of the first light L11 emitted from each of the LED light sources 622 does not enter the light guiding rod 51, resulting in a problem of a decrease in the efficiency at which the first light L11 is used. In general, an LED light source having high light emission efficiency has a large size, and there is therefore a demand for use of a large LED light source.

To solve the problem described above, in the light source apparatus 2 according to the present embodiment, since the width of each of the LED light sources 622 (dimension D in FIG. 2) is smaller than the sum of the width of the light guiding rod 51 (dimension B in FIG. 2) and the width of the wavelength conversion rod 58 (dimension C in FIG. 2), the light exiting surface of each of the LED light sources 622 does not extend off the side surfaces of the light guiding rod 51 or the wavelength conversion rod 58. A sufficient amount of the first light L11 emitted from each of the LED light sources 622 can therefore be caused to enter the light guiding rod 51 and the wavelength conversion rod 58, whereby the efficiency at which the first light L11 is used can be increased. Further, since the LED light sources 622 are each shared by the light guiding rod 51 and the wavelength conversion rod 58, reduction in size, cost, and etendue of the light source apparatus 2 can be achieved without an excessive increase in the number of LED light sources 622.

In the light source apparatus 2 according to the present embodiment, in which the light transmissive member 65 is interposed between the LED light sources 622 and the light guiding rod 51, the first light L11 emitted from each of the LED light sources 622 propagates the interior of the light transmissive member 65 and enters the light guiding rod 51. The configuration described above can suppress unnecessary refraction or reflection as compared with a case where the LED light sources 622 are so disposed as to be separate from the light guiding rod 51 and air is interposed therebetween, whereby the amount of first light L11 that enters light guiding rod 51 can be increased. In the present embodiment, in particular, in which the refractive index of the light transmissive member 65 is equal to the refractive index of the light guiding rod 51, the amount of first light L11 that enters the light guiding rod 51 can be maximized. The efficiency at which the first light L11 is used can therefore be increased. In the present embodiment, in particular, in which the light transmissive member 65 is in contact with the light source section 62 and the light guiding rod 51, loss of the first light L11 is suppressed, whereby the efficiency at which the first light L11 is used can be further increased.

In the light source apparatus 2 according to the present embodiment, the angle converter 56 is provided on the light exiting side of the dichroic prism 55 and can therefore parallelize the combined light LW having exited out of the dichroic prism 55. Further, the collimator lens 57 is provided on the light exiting side of the angle converter 56 and can therefore further increase the parallelism of the combined light LW. The light use efficiency in an optical system on the downstream of the light source apparatus 2 can thus be increased.

The projector 1 according to the present embodiment, which includes the light source apparatus 2 described above, allows size reduction and excels in the light use efficiency.

Second Embodiment

A second embodiment of the present disclosure will be described below with reference to FIG. 5.

A light source apparatus according to the second embodiment has the same basic configuration as that in the first embodiment, but the configuration of the light source section differs from that in the first embodiment. The entire configuration of the light source apparatus will therefore not be described.

Figure 5:
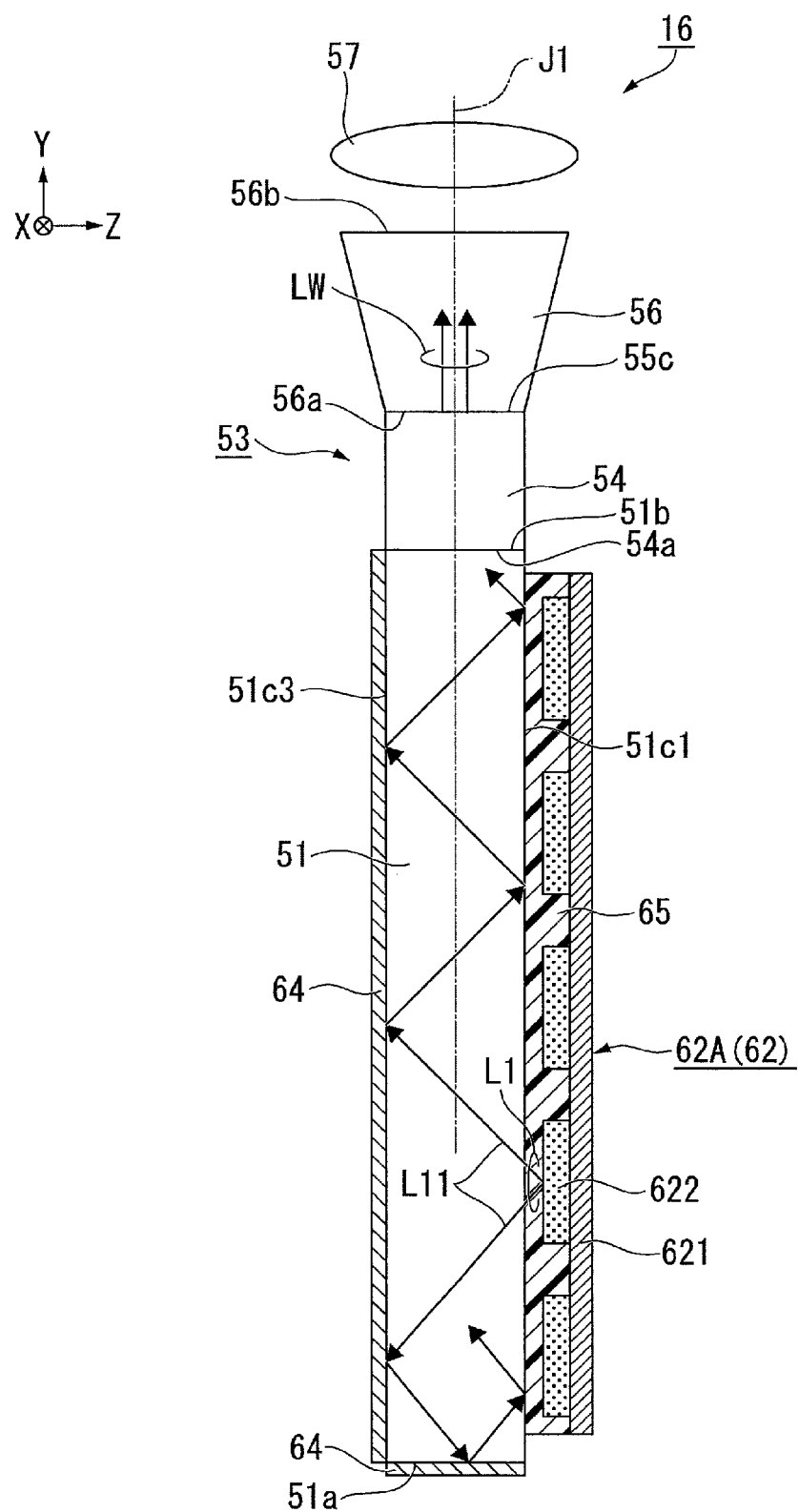
FIG. 5 is a side view of a light source apparatus according to a second embodiment.

FIG. 5 is a side view showing a schematic configuration of the light source apparatus according to the second embodiment.

In FIG. 5, components common to those in FIG. 2 have the same reference characters and will not be described.

A light source apparatus 16 includes the light guiding rod 51 (light guide), the wavelength conversion rod 58 (wavelength converter), the light source section 62, the light transmissive member 65, the light combiner 53, the angle converter 56, and the collimator lens 57, as shown in FIG. 5.

The light source section 62 includes the first light source 62A. The first light source 62A is provided in a position where the first light source 62A faces the first side surface 51c1 of the light guiding rod 51 and the second side surface 58c2 of the wavelength conversion rod 58. The light source section 62 includes no second light source 62B, unlike in the first embodiment, in which the second light source 62B is provided in a position where the second light source 62B faces the third side surface 51c3 of the light guiding rod 51 and the fourth side surface 58c4 of the wavelength conversion rod 58.

The third side surface 51c3 of the light guiding rod 51 is provided with the mirror 64. The mirror 64 is formed, for example, of a dielectric multilayer film or a metal film formed on a surface of the light transmissive material of which the light guiding rod 51 is made. From the viewpoint of suppression of optical loss, the mirror 64 is desirably formed of a dielectric multilayer film.

The other configuration of the light source apparatus 16 is the same as the configuration of the light source apparatus in the first embodiment.

The present embodiment also provides the same effect as that provided by the first embodiment, that is, a compact, low-etendue light source apparatus 16 can be achieved.

The light source apparatus 62 according to the present embodiment includes only the first light source 62A, which faces the first side surface 51c1 of the light guiding rod 51, but includes the mirror 64 provided on the third side surface 51c facing away from the first side surface 51c1 and therefore prevents the first light L11 having entered the light guiding rod 51 via the first side surface 51c1 from exiting out of the light guiding rod 51 via the third side surface 51c3. The efficiency at which the first light L11 is extracted can therefore be increased.

Third Embodiment

A third embodiment of the present disclosure will be described below with reference to FIG. 6.

A light source apparatus according to the third embodiment has the same basic configuration as that in the first embodiment, but the configuration of the light source section differs from that in the first embodiment. The entire configuration of the light source apparatus will therefore not be described.

Figure 6:
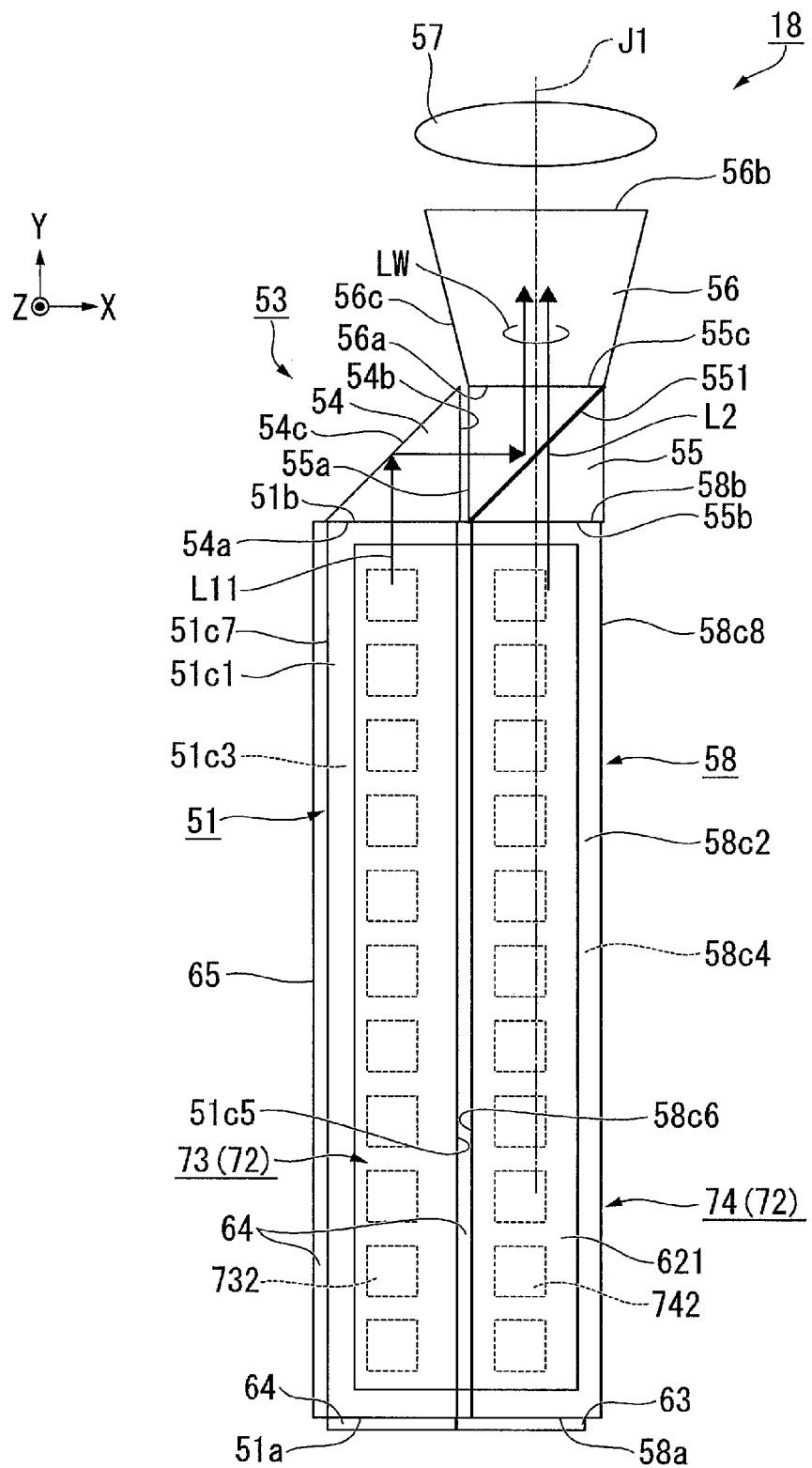
FIG. 6 is a plan view of a light source apparatus according to a third embodiment.

FIG. 6 is a plan view showing a schematic configuration of a light source apparatus 18 according to the third embodiment.

In FIG. 6, components common to those in FIG. 2 have the same reference characters and will not be described.

The light source apparatus 18 includes the light guiding rod 51 (light guide), the wavelength conversion rod 58 (wavelength converter), a light source section 72, the light transmissive member 65, the light combiner 53, the angle converter 56, and the collimator lens 57, as shown in FIG. 6.

The light source section 72 includes a light source for a light guiding rod 73 and a light source for a wavelength conversion rod 74. The light source for a light guiding rod 73 and the light source for a wavelength conversion rod 74 have the same configuration and each includes the substrate 621 and a plurality of LED light sources 732 and 742 mounted on one surface of the substrate 621. Specifically, the light source for a light guiding rod 73 includes a plurality of first LED light sources 732 arranged along the lengthwise direction N1 of the light guiding rod 51 with a gap between each of the first LED light sources 732 and an adjacent first LED light source 732. The plurality of first LED light sources 732 each emit the first light L11 toward the light guiding rod 51. The light source for a wavelength conversion rod 74 includes a plurality of second LED light sources 742 arranged along the lengthwise direction N2 of the wavelength conversion rod 58 with a gap between each of the second LED light sources 742 and an adjacent second LED light source 742. The plurality of second LED light sources 742 each emit the excitation light L12 toward the wavelength conversion rod 58.

The first light L1 emitted from each of the first LED light sources 732 propagates through the interior of the light guiding rod 51, then exits out of the light guiding rod 51, and functions as blue light that forms part of the illumination light. On the other hand, the excitation light L12 emitted from each of the second LED light sources 742 enters the wavelength conversion rod 58 and then excites the phosphor contained in the wavelength conversion rod 58. As described above, the function of the first light L11 emitted from each of the first LED light sources 732 and the function of the excitation light L12 emitted from each of the second LED light sources 742 differ from each other. Therefore, the first LED light sources 732 and the second LED light sources 742 may each emit light having an optimized wavelength as the blue light or excitation light and different from the wavelength of the light emitted from the first LED light sources 732 or the second LED light sources 742 or may emit light having a wavelength used commonly to the two functions.

The other configuration of the light source apparatus 18 is the same as the configuration of the light source apparatus in the first embodiment.

The present embodiment also provides the same effect as that provided by the first embodiment, that is, a compact, low-etendue light source apparatus 18 can be achieved.

Further, since the blue first light L11 having exited out of the light guiding rod 51 and the yellow second light L2 having exited out of the wavelength conversion rod 58 are combined with each other into white combined light LW, adjusting the balance between the amount of first light L11 and the amount of second light L12 can adjust the white balance of the white light. As a specific method for adjusting the white balance, for example, the light source apparatus 18 may include sensors that detect the amounts of first light L11 and second light L2, and the electric power supplied to the first LED light sources 732 and the second LED light sources 742 may be adjusted as appropriate in accordance with the amount of deviation of each of the amounts of light detected with the sensors from a standard value. Further, as a method for adjusting the white balance in the design stage, the numbers of first LED light sources 732 and second LED light sources 742 may be adjusted, or the lengths and thicknesses of the light guiding rod 51 and the wavelength conversion rod 58 may be adjusted.

Fourth Embodiment

A fourth embodiment of the present disclosure will be described below with reference to FIG. 7.

The first embodiment has been described with reference to a liquid crystal projector, and the fourth embodiment will be described with reference to a projector including a micromirror-type light modulator.

Figure 7:
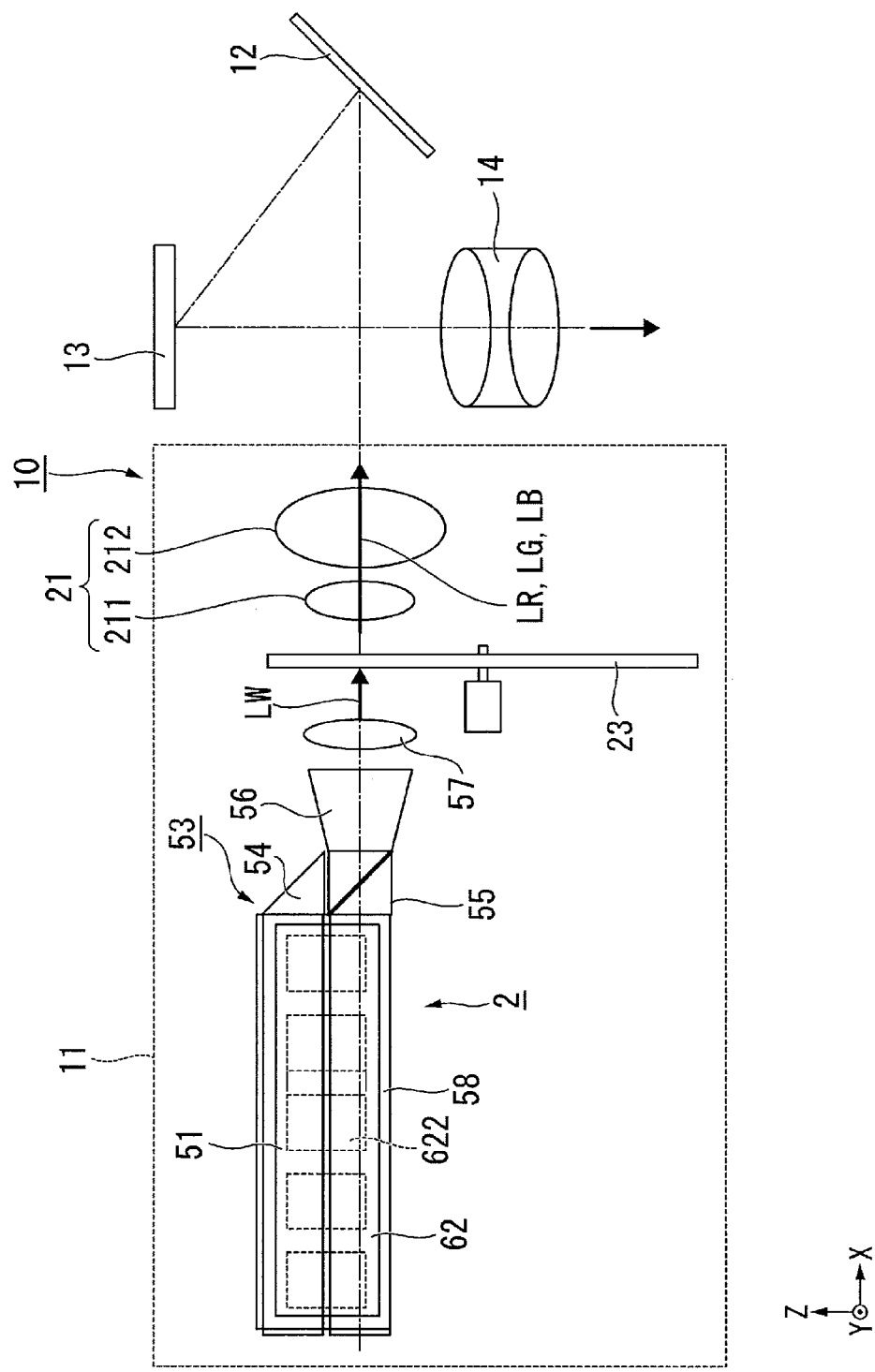
FIG. 7 is a schematic configuration diagram of a projector according to a fourth embodiment.

A projector 10 according to the fourth embodiment includes an illuminator 11, a light guide system 12, a micromirror-type light modulator 13, and a projection optical apparatus 14, as shown in FIG. 7. The illuminator 11 includes the light source apparatus 2, a color wheel 23, and a pickup system 21.

In the fourth embodiment, the light source apparatus 2 according to the first embodiment is used as the light source apparatus 2 of the projector 10. It is, however, noted that the light source apparatus 16 according to the second embodiment or the light source apparatus 18 according to the third embodiment may be used as the light source apparatus 2 of the projector 10. In the fourth embodiment, the light source apparatus 2 will not therefore be described.

The color wheel 23 has a configuration in which three color filters, red, green, and blue color filters, are provided on a rotatable substrate along the circumferential direction around the axis of rotation. When the white combined light LW emitted from the light source apparatus 2 passes through the color wheel 23 rotating at high speed, the red light LR, the green light LG, and the blue light LB exit out of the color wheel 23 in a time division manner.

The pickup system 21 is formed of a first lens 211 and a second lens 212. The first lens 211 and the second lens 212 are each formed of a convex lens. The red light LR, the green light LG, and the blue light LB having exited out of the color wheel 23 are transmitted to the light guide system 12 via the pickup system 21.

The light guide system 12 is formed of a reflection mirror. The light guide system 12 reflects the red light LR, the green light LG, and the blue light LB emitted from the light source apparatus 2 and causes the reflected color light to be incident on the light modulator 13 in a time division manner.

The micromirror-type light modulator 13 is, for example, a digital micromirror device (DMD). A DMD has a configuration in which a plurality of micromirrors are arranged in a matrix. The DMD switches at high speed the direction in which the light incident thereon is reflected between the direction in which the reflected light enters the projection optical apparatus 14 and the direction in which the reflected light does not enter the projection optical apparatus 14 by switching the direction in which the plurality of micromirrors incline from one to another. The light modulator 13 thus sequentially modulates the red light LR, the green light LG, and the blue light LB emitted from the light source apparatus 2 to produce a green image, a red image, and a blue image.

The projection optical apparatus 14 projects the green image, the red image, and the blue image on a screen. The projection optical apparatus 14 is formed, for example, of a plurality of projection lenses.

The projector 10 according to the present embodiment, which includes the light source apparatus 2 according to the first embodiment, allows size reduction and excels in the light use efficiency.

The technical range of the present disclosure is not limited to the embodiments described above, and a variety of changes can be made thereto to the extent that the changes do not depart from the substance of the present disclosure.

For example, the light source apparatus according to each of the above-mentioned embodiments has been described with reference to the case where the refractive index of the light transmissive member is equal to the refractive index of the light guide, and the refractive index of the light transmissive member may instead differ from the refractive index of the light guide.

In a case where air is present between the LED light sources and the light guiding rod, the first light is refracted when it enters the light guiding rod, so that the amount of light incident on a side surface of the light guiding rod at angles of incidence smaller than the critical angle undesirably increases. To solve the problem described above, the configuration in which the light transmissive member is present between the LED light sources and the light guiding rod causes the angle of refraction of the first light to decrease as compared with the case where air is present between the LED light sources and the light guiding rod, whereby the amount of light incident on a side surface of the light guiding rod at angles of incidence greater than the critical angle undesirably increases, and the amount of first light that propagates through the light guiding rod increases accordingly. Therefore, even when the refractive index of the light transmissive member differs from the refractive index of the light guide, the efficiency at which the first light L11 is used can be advantageously increased as compared with a case where no light transmissive member is provided.

The above-mentioned embodiments have been described with reference to the case where the LED light sources are so disposed as to face a side surface of the light guiding rod and the first light enters the light guiding rod via the side surface. Instead, the light source apparatus according to any of the embodiments of the present disclosure may have a configuration in which the LED light sources are so disposed as to face an end surface of the light guiding rod and the first light enters the light guiding rod through the light transmissive member and via the end surface.

The above-mentioned embodiments have been described with reference to the case where the wavelength conversion rod contains a phosphor that emits yellow fluorescence. The wavelength conversion rod may instead contain two types of phosphor formed of a phosphor that emits green fluorescence and a phosphor that emits red fluorescence. In this case, the two types of phosphor may be uniformly mixed with each other in the wavelength conversion rod or may be individually present in separate regions of the wavelength conversion rod.

The above-mentioned embodiments have been described with reference to the case where the light source apparatus that emits white light, and the present disclosure is also applicable to a light source apparatus that emits color light other than white light. For example, a light source apparatus may include, for example, a light guiding rod out of which blue light exits and a wavelength conversion rod out of which red light exits and may emit magenta light that is the combination of the blue light and the red light. Also in this case, the present disclosure allows a compact, low-etendue light source apparatus that emits magenta light to be achieved. Further, the light source apparatus described above and the light source apparatus that emits green light may be used to form a light source apparatus that emits white light.

In the embodiments described above, the configuration example in which a prism and a dichroic prism are used as the light combiner has been presented, and another optical member capable of the light combination may also be used. For example, a reflection mirror may be used in place of the prism. Further, a scatterer having a light scattering structure provided therein may be used in place of the dichroic prism. Examples of the scatterer may include glass containing scattering particles and an optical member containing an anisotropic scattering layer. In the case where a scatterer is used, part of the blue light and part of the yellow light can be scattered in the same direction for the light combination although the light use efficiency decreases to some extent.

The shape, the number, the arrangement, the material, and other specific configurations of the components that form the light source apparatuses are not limited to those in the embodiments described above and can be changed as appropriate.

The above-mentioned first embodiment has been described with reference to the case where the present disclosure is applied to a transmissive liquid crystal projector, and the present disclosure is also applicable to a reflective liquid crystal projector. The term "transmissive" used herein means that a liquid crystal light valve including a liquid crystal panel or any other component transmits light. The term "reflective" means that the liquid crystal light valve reflects light.

The above-mentioned first embodiment has been described with reference to a projector including three liquid crystal panels. The present disclosure is also applicable to a projector using only one liquid crystal light valve and a projector using four or more liquid crystal light valves.

The above-mentioned embodiments have been described with reference to the case where the light source apparatus according to any of the embodiments of the present disclosure is incorporated in a projector, but not necessarily. The light source apparatus according to any of the embodiments of the present disclosure may also be used as a lighting apparatus, a headlight of an automobile, and other components.

What is claimed is:

1. A light source apparatus comprising:
a light source section that emits first light and excitation light having a first wavelength band;
a light guide that causes the first light emitted from the light source section to propagate;
a wavelength converter including a phosphor that emits second light having a wavelength band different from the wavelength band of the excitation light when the phosphor is excited with the excitation light emitted from the light source section; and
a light combiner that combines the first light having exited out of the light guide with the second light having exited out of the wavelength converter,
wherein the light guide and the wavelength converter are disposed side by side, and
a light transmissive member that transmits the first light is provided between the light source section and the light guide.

2. The light source apparatus according to claim 1,
wherein the light guide has a first end surface and a second end surface that face each other and a first side surface that intersects the first end surface and the second end surface,
the wavelength converter has a third end surface and a fourth end surface that face each other and a second side surface that intersects the third end surface and the fourth end surface,
the light source section is provided in a position where the light source section faces the first side surface and the second side surface, and
the light transmissive member is provided between the light source section and the first side surface.

3. The light source apparatus according to claim 2, wherein the light combiner is disposed in a position where the light combiner faces the second end surface and the fourth end surface.

4. The light source apparatus according to claim 3, wherein the light combiner includes a prism that faces the second end surface and a dichroic prism that faces the fourth end surface.

5. The light source apparatus according to claim 1, wherein the light transmissive member is made of transparent resin.

6. The light source apparatus according to claim 1, wherein a refractive index of the light transmissive member is equal to a refractive index of the light guide.

7. The light source apparatus according to claim 1, wherein the light transmissive member is in contact with the light source section and the light guide.

8. The light source apparatus according to claim 1, wherein the light guide and the wavelength converter are so disposed that the light guide and the wavelength converter are adjacent to each other and a lengthwise direction of the light guide is parallel to a lengthwise direction of the wavelength converter.

9. The light source apparatus according to claim 1, wherein the light source section includes a light emitting diode light source.

10. The light source apparatus according to claim 1,
wherein the first light is blue light and the second light is yellow fluorescence, and
the light combiner combines the first light and the second light with each other into white combined light, and the white combined light exits out of the light combiner.

11. A projector comprising:
the light source apparatus according to claim 1;
a light modulator that modulates light from the light source apparatus in accordance with image information; and
a projection optical apparatus that projects the light modulated by the light modulator.

12. The light source apparatus according to claim 2, wherein
the light transmissive member is provided between the light source section and the first side surface along a normal to the first side surface, and
the light transmissive member is not provided between the light source section and the second side surface along a normal to the second side surface.

13. A light source apparatus comprising:
a first light source that emits first light having a first wavelength band;
a second light source that emits excitation light;
a light guide that causes the first light emitted from the first light source to propagate;

a wavelength converter including a phosphor that emits second light having a wavelength band different from the wavelength band of the excitation light when the phosphor is excited with the excitation light emitted from the second light source;

a light combiner that combines the first light having exited out of the light guide with the second light having exited out of the wavelength converter; and a light transmissive member that transmits the first light, wherein the light guide and the wavelength converter are disposed side by side, the light guide has a first end surface and a second end surface that face each other and a first side surface that intersects the first end surface and the second end surface, the wavelength converter has a third end surface and a fourth end surface that face each other and a second side surface that intersects the third end surface and the fourth end surface, the first light source is provided in a position where the first light source faces the first side surface, the second light source is provided in a position where the second light source faces the second side surface, and the light transmissive member is provided between the first light source and the first side surface.

14. The light source apparatus according to claim 13, wherein the light transmissive member is not provided between the second light source and the second side surface.

* * * * *